March 11, 1941.　　　C. G. PREIS　　　2,234,195
METHOD OF MANUFACTURING TIN PLATE
Filed Jan. 12, 1938　　　2 Sheets-Sheet 1
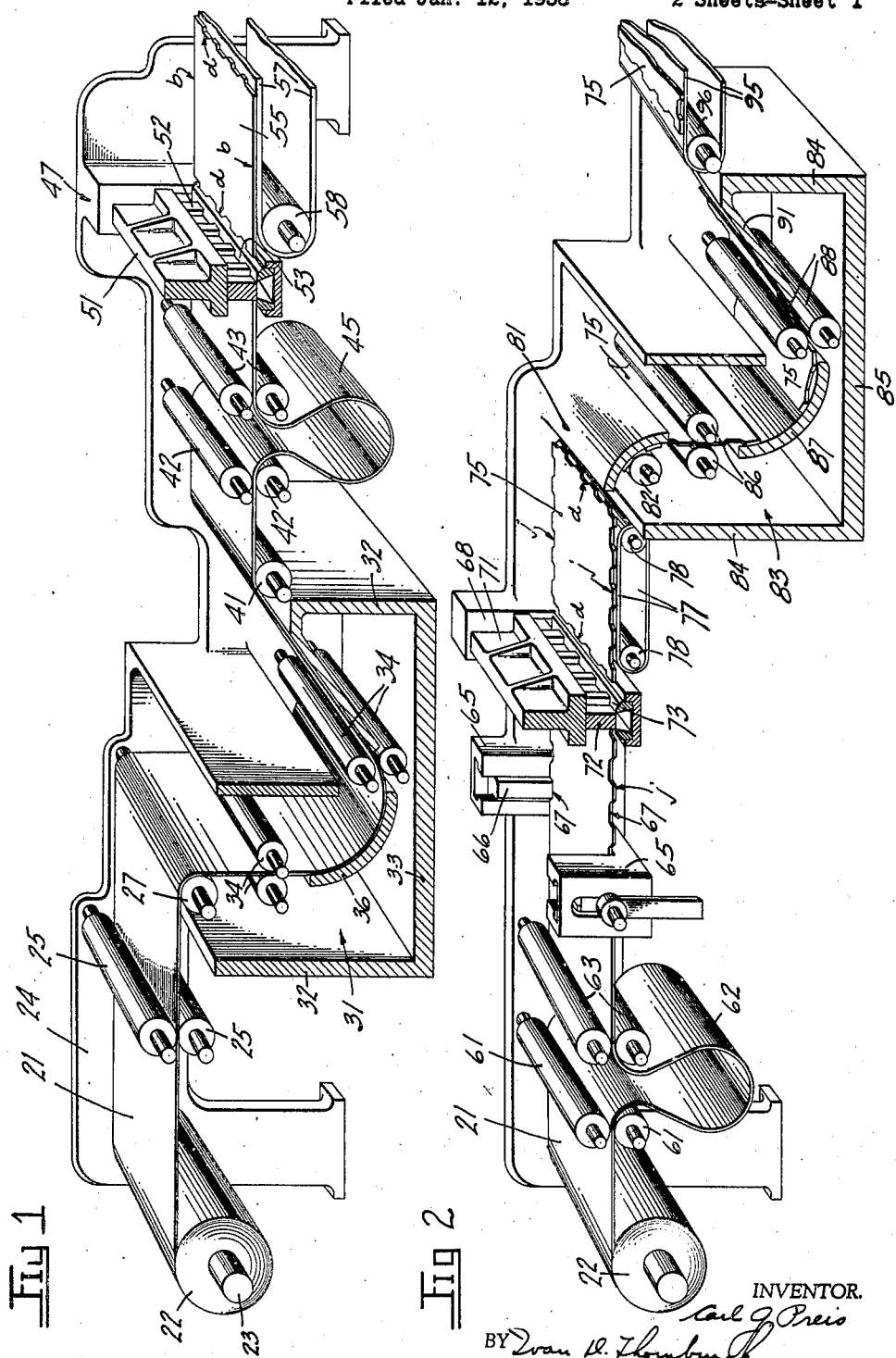
INVENTOR.
Carl G. Preis
BY
ATTORNEYS March 11, 1941.  C. G. PREIS  2,234,195
METHOD OF MANUFACTURING TIN PLATE
Filed Jan. 12, 1938  2 Sheets-Sheet 2
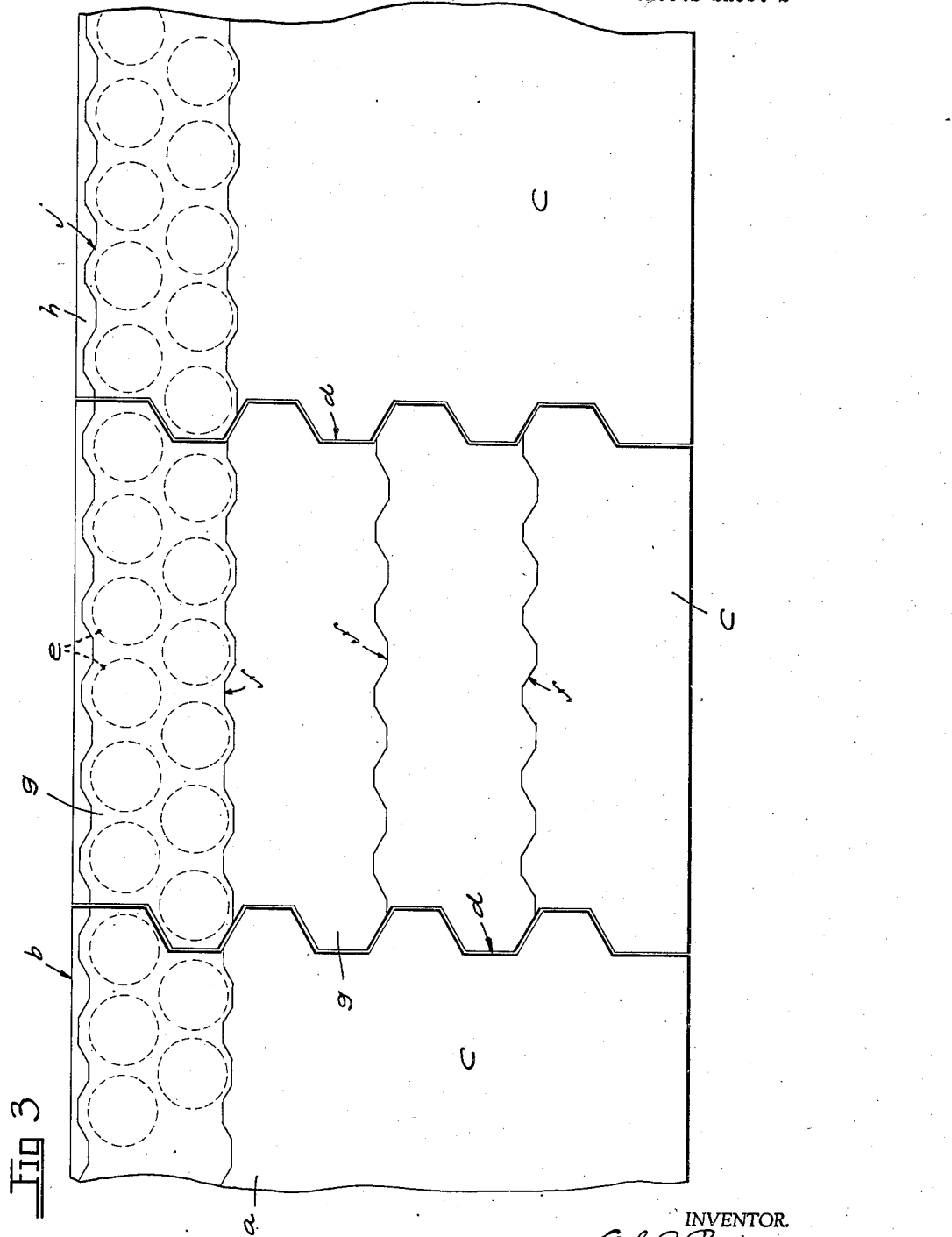
INVENTOR.
Carl G. Preis
BY Ivan O. Thornburgh
Charles H. Cyple
ATTORNEYS Patented Mar. 11, 1941

2,234,195

UNITED STATES PATENT OFFICE 2,234,195

METHOD OF MANUFACTURING TIN PLATE

Carl G. Preis, New York, N. Y., assignor to American Can Company, New York, N. Y., a corporation of New Jersey Application January 12, 1938, Serial No. 184,689

1 Claim. (Cl. 29—148)

The present invention relates to preparing sheets of tin plate in the tin plate mill for subsequent use in the manufacture of tin can parts or other non-rectangular articles and has particular reference to preparing a sheet of predetermined configuration which can be used subsequently by the can manufacturer with a minimum of waste.

In large scale production of tin can parts in a can manufacturing plant where millions of articles are produced by punching, blanking and forming from tin coated sheets any areas of the sheet which are not cut out at that time or later, represent waste and become scrap which has a very small resale value. Obviously even small portions of waste in a single sheet when multiplied by the millions of sheets used by a single large can manufacture for example become a serious loss, and many attempts have been made to minimize such waste.

In the present invention it is contemplated to save this waste at the tin mill by first removing such areas from the sheet as will not be of value in subsequent cutting of the sheet and by the removing of the stock at a time and place where it has a value, i. e., where it can be put back again into the melting pot and where added expense such as scrap handling and transportation charges can be entirely avoided. The making of black iron stock in web form has now become common practice in the tin mills and such form of tin plate production is best adapted to the saving of waste according to the present invention.

An object of the invention is the provision of a method of preparing sheets of tin plate from web material in a manner that will provide sheets having the greatest usable cutting areas for the subsequent production of articles.

A further object of the invention is the provision of such a method wherein sheets having two or more scroll edges are produced directly from web material, the final scroll sheets being fully tinned and ready for use in the manufacture of non-rectangular articles.

Numerous other objects and advantages of the invention will be apparent as it is better understood from the following description, which, taken in connection with the accompanying drawings, discloses a preferred embodiment thereof.

Referring to the drawings:

Figure 1 is a schematic, perspective view showing steps embodying the present invention, such steps including operation on a web of material whereby fully tinned sheets having two scroll edges are cut from the web without great loss of material;

Fig. 2 shows a similar view wherein the steps are slightly changed in order of sequence of operation, fully tinned sheets having more than two scroll edges being produced from a web of material; and Fig. 3 is a schematic plan layout of certain cutting of tin plate when used in the manufacture of circular articles.

The drawings illustrate two forms of procedure both insuring practically the same production of a sheet of tin plate in which the sum of the cutting areas of articles subsequently to be made from the sheet closely corresponds with the total area of the sheet as it is provided at the tin mill. In the arrangement of procedure according to Fig. 1, a web of black iron stock is first tinned before it is cut into individual sheets, the operation of cutting being done along a scroll line of cut to minimize waste of the sheet and prepare it for more efficient subsequent use by the can manufacturer or otherwise. When the method steps are employed according to this disclosure the resulting individual sheet is provided with two oppositely disposed scroll edges and the side edges of the sheet are left straight.

In Fig. 2 a slightly different procedure is used although the results are substantially the same. In this second modification of the invention a web of black iron stock is first notched along its side edges, is then transversely divided into individual sheets by a scroll line of cut and the resulting individual sheets have four scroll edges.

These sheets are passed through a tinning operation so that the sheet as finally prepared by the tin mill is tin coated and properly edged, this time with four scroll edges. This form of sheet for some purposes has a higher cutting efficiency inasmuch as more of the waste is removed by the scroll cutting of the side edges of the web prior to its being divided into individual sheets.

In order to further explain the efficiency of cutting of non-rectangular work as by a can manufacturer, Fig. 3 is used to disclose schematically a typical layout of cutting circular articles from the sheet. This view furthermore suggests the common practice in can manufacturing procedure of first dividing a sheet into scroll strip form suitable for automatic feeding into and through cutting, blanking or forming die mechanism at which time the effective cutting area is removed from the strip to provide the desired articles.

A web of material is designated in Fig. 3 by the letter $a$ and such a web primarily is formed with straight side edges $b$. Irrespective of the precise steps of the method used, the web is divided into individual sheets $c$ by cutting along a transverse line extending from one side to the other. Such a line of cut is made in scroll form, this transverse cutting being designated by the letter $d$.

The articles to be cut from the sheet are shown as being circular, although any shape not rectangular will more or less dictate the type of layout. The circular shape or blanking line of cut is designated in Fig. 3 by the letter $e$. The available cutting areas for the circles may be arranged in two or more rows and alternate rows are staggered according to well known practices in the can making art.

When the individual sheet $c$ is received at the can manufacturer's plant, if the cutting is to be done in automatic strip feed presses, the sheet is first divided longitudinally by other scroll lines of cut $f$, producing what is known in the art as a scroll strip $g$. Each of the scroll strips illustrated in Fig. 3 contains two rows of cutting areas and this form is used in a double die cutting press. In many cases more than two rows are used and gang dies may then be utilized. In many cases a single row of cutting areas is found advantageous for a single die automatic strip feed press. In that case the double row strip $g$ would be further longitudinally divided along scroll lines of cut in order to produce a single row of available cutting spaces.

In the illustration shown in Fig. 3 it is contemplated to cut an edge scrap $h$ by means of a scroll cut $j$ on one edge. Two outside edges of the sheet would be so cut by the scroll lines $j$. Such an operation of scrap cutting will be used in the first suggested phase of the present invention, that is, according to the showing in Fig. 1. In Fig. 2 the can manufacturer will not do any edge cutting to produce the scrap $h$ since the sheet as finally delivered to the can manufacturer by the tin mill would have all four of its edges cut along scroll lines.

When the steps of Fig. 1 are carried out a web of material such as black iron stock, designated by the numeral 21, may be fed from a reel or roll 22 of such material. The roll may be carried on a shaft 23 from which it is unwound as the web passes through its operations in the tin mill. The shaft 23 may be suitably journalled in bearings formed in a main frame 24. Feed rollers 25 are used to draw the web from its roll and these rollers may be mounted and rotated in any suitable manner.

The web 21 after passing through the feed rollers 25 advances over a horizontal guiding roller 27 suitably mounted and rotated. The web 21 after passing over the roller 27 is moved down into a vertical position where it enters into a tinning operation. The tin bath and frame therefore is schematically suggested in the drawings as an enclosing vessel 31 formed with vertical side walls 32 and a bottom 33.

Vessel 31 holds the usual molten tin and on the surface of the liquid metal there will be the usual palm oil as is well known in the practice of tin plate coating. To assist the web 21 in the proper travel through the tinning operation, pairs of guiding rollers 34 may be suitably mounted within the vessel. A curved guide plate 36 is located within the vessel and assists in properly guiding the sheet through the tinning operation.

The tinned web having both sides properly coated passes over a roller 41 and thence through a pair of pull rollers 42 suitably mounted in the frame of the machine. Adjacent the pull rollers 42 is a pair of secondary pull rollers 43 and the web of material 21 is so fed into the machine as to form a loop 45. The pull rollers 42 are continuously rotated in proper time with the other continuous operations relative to the web as it travels between supply reel 22 and the pull rollers 42.

The rollers 43 are intermittently rotated and the loop 45 allows for the continuous advancement of the web into the rollers 42 and for the step movement of the web from the rollers 43 this being a well known expedient of web feeding. The rollers 43 push the web into a scroll cutting die mechanism 47 mounted adjacent the roller 43. This mechanism 47 includes a vertically movable cross head 51 which carries the movable element of a scroll die 52. The rollers 43 when at rest, hold the end of the web in proper position for cutting beneath the movable die 52.

The movable die element 52 cooperates with a stationary die element 53 which is mounted within the scroll cutting mechanism 47. The web is moved between the dies 52, 53 to bring it into proper cutting position and a transverse scroll cut made by the dies (the cut $d$ of Fig. 3) severs from the web an individual sheet 55. After the sheet 55 has been severed from the end of the web it is conveyed away to any suitable place of deposit as by a continuously moving conveyor belt 57 which in the machine and adjacent the cutting mechanism 47 may pass over a suitable roller 58.

The sheet 55 thus has straight side edges $b$, but the two end edges are formed with the scroll line of cut $d$. In this condition the sheets is suitable for subsequent article manufacture. According to this practice of operation, as exemplified by Fig. 1, there is no waste in the tin mill but the scroll cutting of the ends of the sheet provides a more efficient sheet for the purpose of subsequently cutting circular or other non-rectangular articles therefrom. The total area of the divided sheet more nearly corresponds with the combined article cutting areas within the sheet, than within a sheet having only straight edges such as is the usual practice in tin plate manufacture today.

The alternate manner of providing individual scroll sheets having a high cutting efficiency is disclosed in Fig. 2 and for some jobs this procedure will be preferred. The web 21 is fed as before from a reel 22. A pair of feeding rollers 61 is suitably mounted and rotated to feed the web through the operations of the machine. These rollers may be rotated continuously and the web after passing through the rollers is formed into a loop 62 from which it passes through intermittently rotated pull rollers 63 which are suitably mounted and rotated to effect the cutting operations subsequently following.

In this form of procedure the web 21 as advanced by the roller 63 first moves into position between notching die mechanisms 65 arranged on opposite sides of the sheet and the web edges are notched as the web is brought to rest. These mechanisms include proper movable cutting dies 66 which cooperate with lower stationary dies to cut out a waste or scrap section. This continues as the web advances and there results notched or scroll edges of the web as at 67. This provides the scroll edge j previously referred to in the description relating to Fig. 3 above. The loop 62 allows for the continuous feeding of the web into the rollers 61 and for the intermittent movement of the web through the rollers 63.

The notched end of the web after passing through the mechanism 65, passes into a suitable scroll cutting die mechanism 68, this corresponding in operation to the mechanism 47 referred to in connection with Fig. 1. A movable cross head 71 carries an upper scroll die 72 which, when the web is at rest beneath, moves down and cuts through the web, cooperating with a stationary lower scroll die 73. This die operation transversely cuts across the web in a scroll line of cut (cut d as shown in Fig. 3) and severs an individual sheet 75 from the web.

After the individual sheet 75 is cut from the web it falls upon a continuously movable belt 77 which passes over supporting and driving rollers 78 actuated in suitable manner to effect removal of the sheet from the cutting mechanism.

The individual sheet is then passed through a tinning operation which is analogous to the operation referred to above. In this instance the sheet may pass under a curved guiding plate 81 and over a continuously rotating roller 82 mounted in a suitable tinning vessel 83. Such a vessel is herein shown as formed with vertical side walls 84 and a bottom 85 and is adapted to hold the molten tin. The roller 82 guides the sheet through a pair of feed rollers 86 mounted inside of the tin bath, it being understood that the molten tin and the palm oil for the usual tinning operation are contained within the vessel 83.

The sheet 75 after leaving the rollers 86 passes over a curved plate 87 mounted within the tinning vessel 83 and thence into rollers 88 which advance it over an inclined wall 91 which may be an integral part of one of the vertical walls 84 of the tinning bath. The sheet passes from the inclined wall 91 and falls onto a continuously moving discharge belt 95. At the machine end such a belt operates over a roller 96. This belt removes the sheet from the tinning bath into a suitable place of deposit.

The sheet 75 is then in condition to be sent from the tin mill to the tin manufacturer or elsewhere. It is formed with four scroll edges and as such provides for an improved cutting efficiency in sheets of this nature. The total area of the sheet more nearly corresponds with the combined article cutting areas within the sheet and the waste or scrap material, which has already been removed in the tin mill, may be put back into the melting pot and does not represent a loss as is present when old methods of straight edged sheets are made.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

I claim:

A method of manufacturing tin stock to avoid waste of material in subsequent article cutting, which comprises, immersing and continuously passing black iron stock in sheet form through a molten tin bath, and scroll cutting opposite edges of said stock as a separate step in immediate conjunction with and incident to the tinning operation while simultaneously severing said stock into individual sheets, whereby the total area of the scroll cut sheet corresponds closely to the total number of articles to be formed therefrom, and the presence of undue waste scrap during the subsequent formation of such articles from said tinned sheet, and the necessity of returning said scrap to a tin mill, is eliminated.

CARL G. PREIS.